United States Patent
Vuyyuru et al.

(10) Patent No.: US 11,941,401 B1
(45) Date of Patent: Mar. 26, 2024

(54) INSTRUCTION FETCH USING A RETURN PREDICTION CIRCUIT

(71) Applicant: Apple Inc., Cupertino, CA (US)

(72) Inventors: Pruthivi Vuyyuru, Santa Clara, CA (US); Ian D. Kountanis, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/806,234

(22) Filed: Jun. 9, 2022

(51) Int. Cl.
*G06F 9/38* (2018.01)
*G06F 9/30* (2018.01)

(52) U.S. Cl.
CPC ........ *G06F 9/3806* (2013.01); *G06F 9/30134* (2013.01)

(58) Field of Classification Search
CPC ... G06F 9/3806; G06F 9/30134; G06F 9/3802
See application file for complete search history.

(56) References Cited

U.S. PATENT DOCUMENTS

| | | | |
|---|---|---|---|
| 6,973,563 B1 * | 12/2005 | Sander .................. | G06F 9/3844 712/242 |
| 9,201,658 B2 * | 12/2015 | Kountanis ............. | G06F 9/3842 |
| 9,367,471 B2 * | 6/2016 | Blasco-Allue ........ | G06F 9/3802 |
| 10,445,102 B1 | 10/2019 | Pistol et al. | |
| 2014/0344558 A1 * | 11/2014 | Holman .................. | G06F 9/382 712/239 |
| 2015/0169041 A1 * | 6/2015 | Blasco .................. | G06F 1/3275 713/320 |
| 2019/0303161 A1 | 10/2019 | Nassi et al. | |
| 2020/0310811 A1 | 10/2020 | Ishii et al. | |

FOREIGN PATENT DOCUMENTS

GB 2542831 A * 4/2017 ......... G06F 9/30054

\* cited by examiner

*Primary Examiner* — Courtney P Carmichael-Moody
(74) *Attorney, Agent, or Firm* — Kowert, Hood, Munyon, Rankin & Goetzel, P.C.; Scott W. Pape; Dean M. Munyon

(57) ABSTRACT

An apparatus includes a processor circuit that includes a return address stack circuit, a return prediction circuit, and a fetch control circuit. The return prediction circuit is configured to store, for previously accessed return addresses, fetch parameters for next fetch addresses. The fetch control circuit is configured to in response to a fetch of a call instruction, push a return address onto the return address stack circuit. In response to a fetch of a return instruction that corresponds to the call instruction, the fetch control circuit is further configured to retrieve the return address from the return address stack circuit, and to create, using the return address and fetch parameters retrieved from the return prediction circuit, a next fetch request to retrieve instructions subsequent to the return instruction.

20 Claims, 11 Drawing Sheets

600

Storing, by a fetch control circuit in a return prediction circuit, fetch parameters corresponding to previously accessed return addresses.
610

In response to fetching a call instruction, pushing, by the fetch control circuit, a return address onto a return address stack.
620

In response to fetching a return instruction corresponding to the call instruction:
630

Retrieving the return address from the return address stack.
634

Creating, using the return address and fetch parameters retrieved from the return prediction circuit, a next fetch request for the return instruction.
638

*FIG. 6*

```
                  ┌─────────────────────────────────────────────────┐
                  │ In response to a fetch of a given call instruction, determining, by the │
  700             │ fetch control circuit, whether an entry for a corresponding return address │
                  │         currently exists in the return prediction circuit.          │
                  │                          710                           │
                  └─────────────────────────────────────────────────┘
                                           │
                                           ▼
                  ┌─────────────────────────────────────────────────┐
                  │ In response to determining that a current entry does not exists, │
                  │ generating, by the fetch control circuit, the entry for the corresponding │
                  │   return address based on fetch parameters determined when a    │
                  │         subsequent return instruction is performed.           │
                  │                          720                           │
                  └─────────────────────────────────────────────────┘
                                           │
                                           ▼
                  ┌─────────────────────────────────────────────────┐
                  │ Selecting, by the fetch control circuit for the generated entry, a particular │
                  │ entry space in the return prediction circuit using a linear-feedback shift │
                  │                        register.                          │
                  │                          730                           │
                  └─────────────────────────────────────────────────┘
```

*In response to a fetch of a given call instruction, determining, by the fetch control circuit, whether an entry for a corresponding return address currently exists in the return prediction circuit.*
710

*In response to determining that a current entry does not exists, generating, by the fetch control circuit, the entry for the corresponding return address based on fetch parameters determined when a subsequent return instruction is performed.*
720

*Selecting, by the fetch control circuit for the generated entry, a particular entry space in the return prediction circuit using a linear-feedback shift register.*
730

*Is an entry available?*
740

*Adjusting, by the fetch control circuit using a particular amount, a respective counter for a selected entry of the return prediction circuit.*
750

*In response to determining that the respective counter has a particular value, replacing, by the fetch control circuit, the fetch parameters in the selected entry with the determined fetch parameters for the subsequent return instruction.*
760

In response to an initial fetch operation using a sequential fetch address, determining, by the fetch control circuit, the sequential fetch parameters associated with the retrieval of instructions from the sequential fetch address.
_910_

In response to determining that at least one of the determined sequential fetch parameters satisfies a particular condition, selecting, by the fetch control circuit for the generated entry, a particular entry space in the sequential prediction circuit..
_920_

Is an entry available?
_930_ yes / no

Adjusting, by the fetch control circuit using a particular amount, a respective counter for a selected entry of the sequential prediction circuit.
_940_

In response to determining that the respective counter has a particular value, replacing the fetch parameters in the selected entry with the determined fetch parameters for the sequential fetch address.
_950_

*FIG. 9*

INSTRUCTION FETCH USING A RETURN PREDICTION CIRCUIT

BACKGROUND

Technical Field

Embodiments described herein are related to computing systems, including systems-on-a-chip (SoCs). More particularly, embodiments are disclosed to techniques for managing instruction fetches in a processor circuit.

Description of the Related Art

Processor circuits, for example, central processor units (CPUs), generally process instructions in a serial order, with a program counter typically incremented to address a next instruction in the program sequence. Control transfer instructions are a type of instruction that may result in a deviation from sequential program order. Control transfer instructions include, for example, branch instruction, call instructions, and return instructions. When a CPU executes one of these control transfer instructions, the program counter, rather than being incremented to address a next instruction, may be loaded with a target address associated with the control transfer instruction. Control transfer instructions enable use of functions, loops, conditional program flows, and the like.

To increase performance, many CPUs retrieve a number of instructions at a time in what may be referred to as a fetch group. Instead of simply retrieving a single instruction at a time, a fetch group is retrieved on the assumption that a plurality of sequential instructions will be executed in a row before a control transfer instruction causes a deviation to the program flow. Branch prediction circuits may be used to predict when a fetch group may include a control transfer instruction that will change the program flow, allowing the CPU to retrieve instructions from a target address of the control transfer instruction rather than from a sequential fetch address.

BRIEF DESCRIPTION OF THE DRAWINGS

The following detailed description makes reference to the accompanying drawings, which are now briefly described.

FIG. 6 depicts a flow diagram of an embodiment of a method for retrieving a fetch group using an entry from a return prediction circuit.

FIG. 7 illustrates a flow diagram of an embodiment of a method for generating an entry for a return prediction circuit.

FIG. 9 depicts a flow diagram of an embodiment of a method for generating an entry for a sequential prediction circuit.

Figure 1:
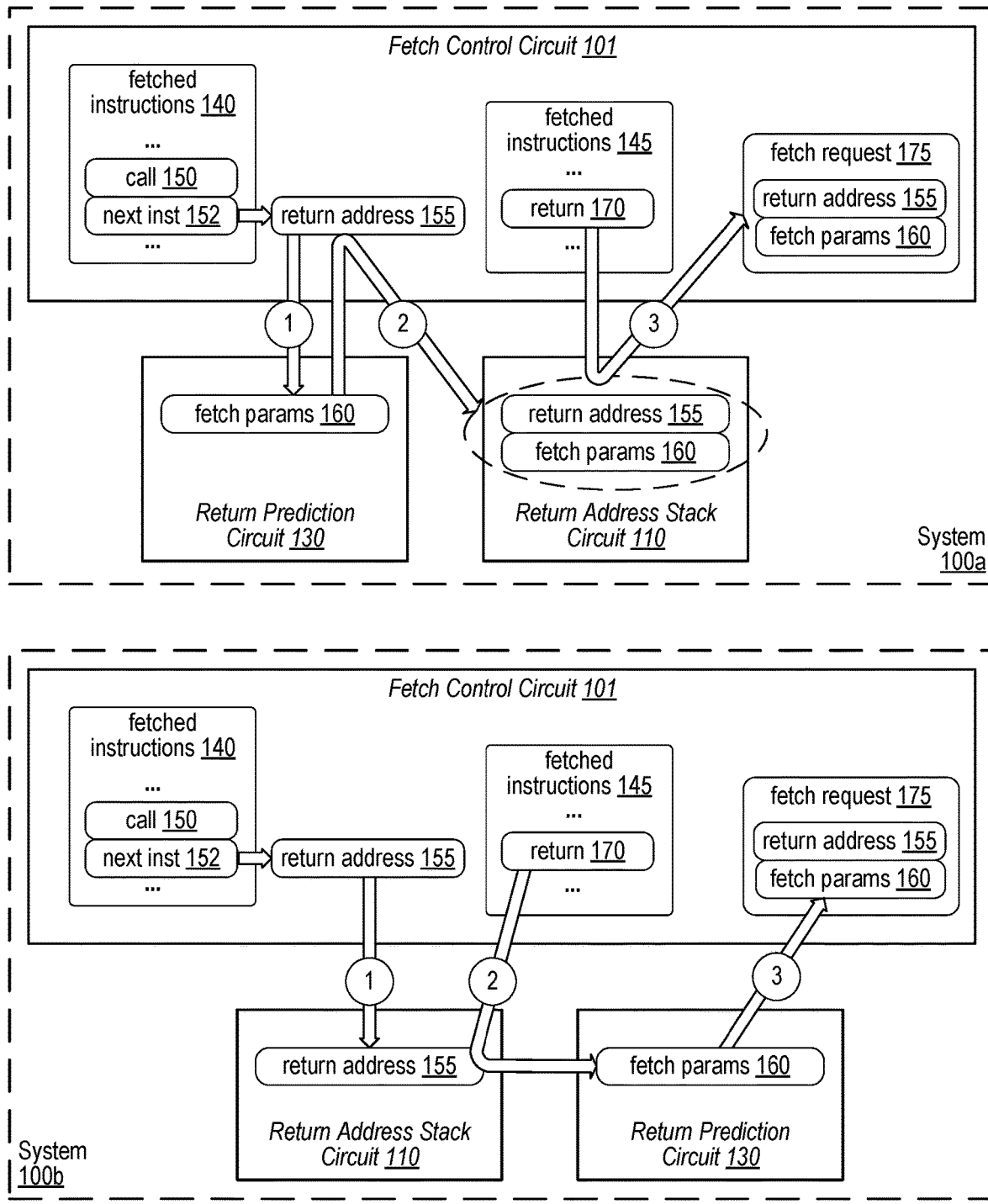
FIG. 1 illustrates block diagrams of two embodiments of a system that includes an fetch control circuit, a return address stack circuit, and return prediction circuit.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

Generally, a processor circuit includes an instruction fetch circuit for retrieving a group of instructions (referred to herein as a "fetch group") from one or more memory circuits, such as an instruction cache circuit. A next fetch predictor circuit may be used to predict an address for retrieving the fetch group (referred to herein as a "fetch address"). This fetch address may be determined based on a prediction of a current fetch group including a control transfer instruction. As used herein, a "control transfer instruction" is a type of instruction that may result in a subsequent instruction to be performed having a non-sequential address from the control transfer instruction. Various types of control transfer instructions include, but are not limited to, branch instructions, call instructions, and return instructions.

In addition to determining a fetch address for a next fetch operation, the next fetch predictor circuit may, in some embodiments, also provide fetch parameters for performing the fetch operation. For example, fetch parameters may include a fetch width value and a branch prediction bank indicator. The fetch width value may be used to predict a position of a first control transfer instruction in the fetch group. Instructions in the fetch group that come after the first control transfer instruction group may not be used since the control transfer instruction directs program flow into a different direction. The fetch width value may, therefore, provide the instruction fetch circuit with an indication of how many instructions from the fetch address to retrieve, up to the control transfer instruction. Unused instructions coming after the control transfer instruction may be ignored, thereby avoiding a waste of bandwidth on fetching these instructions. The branch prediction bank indicator (or simply bank indicator) may be used to indicate which, of a plurality of memory banks holds branch prediction information for the control transfer instruction in the fetch group. A branch direction predictor circuit may predict a direction of a conditional branch may be banked in a similar manner as an instruction cache. Operating bandwidth and power of a processor circuit may be saved by accessing only the banks that hold branch prediction information relevant to the fetch group.

The next fetch predictor circuit, however, may not be capable of predicting fetch width or bank indicators for fetch groups that are at the target address of a return instruction. Target address prediction for return fetch groups comes from a return address stack circuit. A given return instruction in program code may have a different target address depending on which of one or more call instructions leads to the fetching of the return instruction. Accordingly, the next fetch prediction circuit may only predict that the first control transfer instruction in the fetch group is a return instruction and retrieve the target address from the return address stack circuit. Since the target address is pushed onto the return address stack circuit in response to fetching a call instruction, the next fetch predictor circuit does not track the target address of the return instruction. Accordingly, the next fetch predictor circuit also does not track a fetch width or a bank indicator for the return instruction. As a result of retrieving a return fetch group, the instruction fetch circuit may read all instructions for the return fetch group from an instruction cache circuit, and may accessing all banks in the branch direction predictor circuit. Accordingly, power and bandwidth may be wasted due to the indiscriminate instruction fetching and enabling of all banks.

The present disclosure considers novel digital circuits for use in an instruction fetch circuit of a processor circuit by using a return prediction circuit that tracks fetch width and bank indicators for fetch groups at target addresses of return instructions. For example, a processor circuit may include a return address stack circuit, a return prediction circuit, and a fetch control circuit. The return prediction circuit may store, for previously accessed return addresses, fetch parameters for next fetch addresses. The fetch control circuit may, in response to a fetch of a call instruction, push a return address onto the return address stack circuit. In response to a fetch of a return instruction that corresponds to the call instruction, the fetch control circuit may retrieve the return address from the return address stack circuit, and create a next fetch request using the retrieved parameters.

Use of a return prediction circuit may increase an efficiency of an instruction fetch circuit, thereby increasing a bandwidth and lowering power consumption of a processor circuit. Programs may, therefore, be executed with increased efficiency, thereby improving system performance observed by a user and/or increasing a number of programs that may executed concurrently.

FIG. 1 illustrates a block diagram of two embodiments of a system in which a return prediction circuit is used to provide fetch parameters for fetch groups at a target address of a return instruction. As illustrated, systems 100*a* and 100*b* depict two different techniques for retrieving the fetch parameters from return prediction circuit 130. Both of systems 100*a* and 100*b* include fetch control circuit 101 coupled to return address stack circuit 110 and return prediction circuit 130 via a plurality of bus wires. In some embodiments, fetch control circuit 101, return address stack circuit 110, and return prediction circuit 130 may be included as part of a same processor circuit within an integrated circuit. Systems 100*a* and 100*b* may be a part of a computing system, such as a desktop or laptop computer, a smartphone, a tablet computer, a wearable smart device, or the like.

As illustrated, fetch control circuit 101 is configured to retrieve instructions for execution within systems 100*a* and 100*b*. Fetched instructions 140 depict an example of a fetch group retrieved using an instruction fetch operation. To determine a next fetch address for a subsequent fetch operation, fetch control circuit 101 identifies various types of control transfer instructions that may be included in fetched instructions 140. For example, fetch control circuit 101 identifies call instruction (call) 150. In response to the fetch of call instruction 150, fetch control circuit 101 is further configured to push return address 155 onto return address stack circuit 110. Return address stack circuit 110 is configured to hold return addresses associated with a call instruction. A call instruction passes program flow to instructions starting at a target address specified by the call instruction. If and when a return instruction is subsequently executed, then the program flow returns to an instruction immediately following the call instruction. Accordingly, the address of the instruction immediately following the call instruction is the return address. As illustrated, return address 155 corresponds to the address of next instruction (next inst) 152.

As shown, return prediction circuit 130 is configured to store, for previously accessed return addresses, fetch parameters 160 for next fetch addresses. Fetch parameters 160 provide information to fetch control circuit 101 that may be used during a fetch operation of a particular fetch group associated with a corresponding next fetch address. For example, one fetch parameter may be a fetch width indicating a number of instructions to retrieve in the fetch operation. If fetch control circuit 101 identifies, in a previous fetch of a given fetch address, a control transfer instruction included in the particular fetch group, then the fetch width may limit fetch control circuit to retrieving instructions from the given fetch address up to, and including, the control transfer instruction, even if fetch control circuit 101 is capable of fetching more instructions in a single fetch group.

In some embodiments, a branch prediction circuit may be used to determine whether a conditional branch instruction is included in the particular fetch group and predict whether the conditional branch instruction is taken. The branch prediction circuit may include a plurality of banks of information related to prior instances of conditional branch instructions that is used to make the prediction. Another example of a fetch parameter is an indication of which bank of the branch prediction circuit includes the appropriate information for the particular fetch group.

In response to a fetch of return instruction (return) 170 that corresponds to call instruction 150, fetch control circuit 101 may be further configured to retrieve return address 155 from return address stack circuit 110, and to create, using return address 155 and fetch parameters 160 retrieved from return prediction circuit 130, fetch request 175 to retrieve instructions subsequent to return instruction 170. In response to fetching call instruction 150, a one or more subsequent fetch groups may be fetched starting with the target address of call instruction 150. One of these subsequent fetch groups includes return instruction 170 which returns the program flow back to next instruction 152 at return address 155. Using return address 155 to determine a next fetch address, fetch control circuit 101 is configured to generate fetch request 175. Fetch parameters 160 corresponding to return address 155 are retrieved and used, for example, to provide a value for fetch width and a branch prediction bank indicator for a fetch group associated with return address 155.

In various embodiments, fetch parameters 160 may be retrieved in a variety of fashions. Systems 100*a* and 100*b* illustrate two examples for retrieving fetch parameters 160. In system 100*a*, fetch control circuit 101 is configured to, in response to the fetch of call instruction 150, retrieve fetch parameters 160 from return prediction circuit 130 and push fetch parameters 160 onto return address stack circuit 110. As indicated by label 1, fetch control circuit 101 uses return address 155 as an index (or to generate a tag) to access return prediction circuit 130 to determine if an entry corresponding to return address 155 exists. As shown, an entry including fetch parameters 160 exists for return address 155. As indicated by label 2, fetch control circuit 101 receives fetch parameters 160 and pushes both return address 155 and fetch parameters 160 onto return address stack circuit 110. When return instruction 170 is fetched, fetch control circuit 101, as depicted by label 3, pulls the most recent entry from return address stack circuit 110, which includes both return address 155 and fetch parameters 160.

In the example of system 100b, fetch control circuit 101 is configured to retrieve fetch parameters 160 from return prediction circuit 130 in response to the fetch of return instruction 170. Rather than pushing fetch parameters 160 onto return address stack circuit 110 when call instruction 150 is fetched, fetch control circuit 101 waits until return instruction 170 is fetched. Return address 155 is pulled from return address stack circuit 110 and then used to access return prediction circuit 130. After determining that fetch parameters 160 correspond to return address 155, fetch parameters 160 are received from return prediction circuit 130.

Other techniques for retrieving fetch parameters are contemplated. For example, a combination of systems 100a and 100b may be used in which fetch control circuit 101 sets a flag corresponding to return address 155 when pushing return address 155 onto return address stack circuit 110. After pulling return address 155 in response to fetching return instruction 170, fetch control circuit 101 accesses return prediction circuit 130 in response to the flag being set.

It is noted that systems 100a and 100b, as illustrated in FIG. 1, are merely examples. These systems have been simplified to highlight features relevant to this disclosure. Elements not used to describe the details of the disclosed concepts have been omitted. For example, fetch control circuit 101, return address stack circuit 110, and return prediction circuit 130 may be included in a processor circuit. Processor circuits may include various additional circuits that are not illustrated, such as one or more execution circuits, a load-store circuit, an instruction decode circuit, branch prediction circuits, and the like. In various embodiments, fetch control circuit 101, return address stack circuit 110, and return prediction circuit 130 may be implemented using any suitable combination of sequential and combinatorial logic circuits. In addition, register and/or memory circuits, such as static random-access memory (SRAM) may be used in these circuits to temporarily hold information such as instructions, fetch parameters, and/or address values.

In the description of FIG. 1, a return prediction circuit is described as storing fetch parameters related to various fetch addresses. Examples of fetch parameters are disclosed, including fetch widths and branch prediction bank indicators. An example of how a bank indicator may be used by a branch prediction circuit is depicted in FIG. 2.

Figure 2:
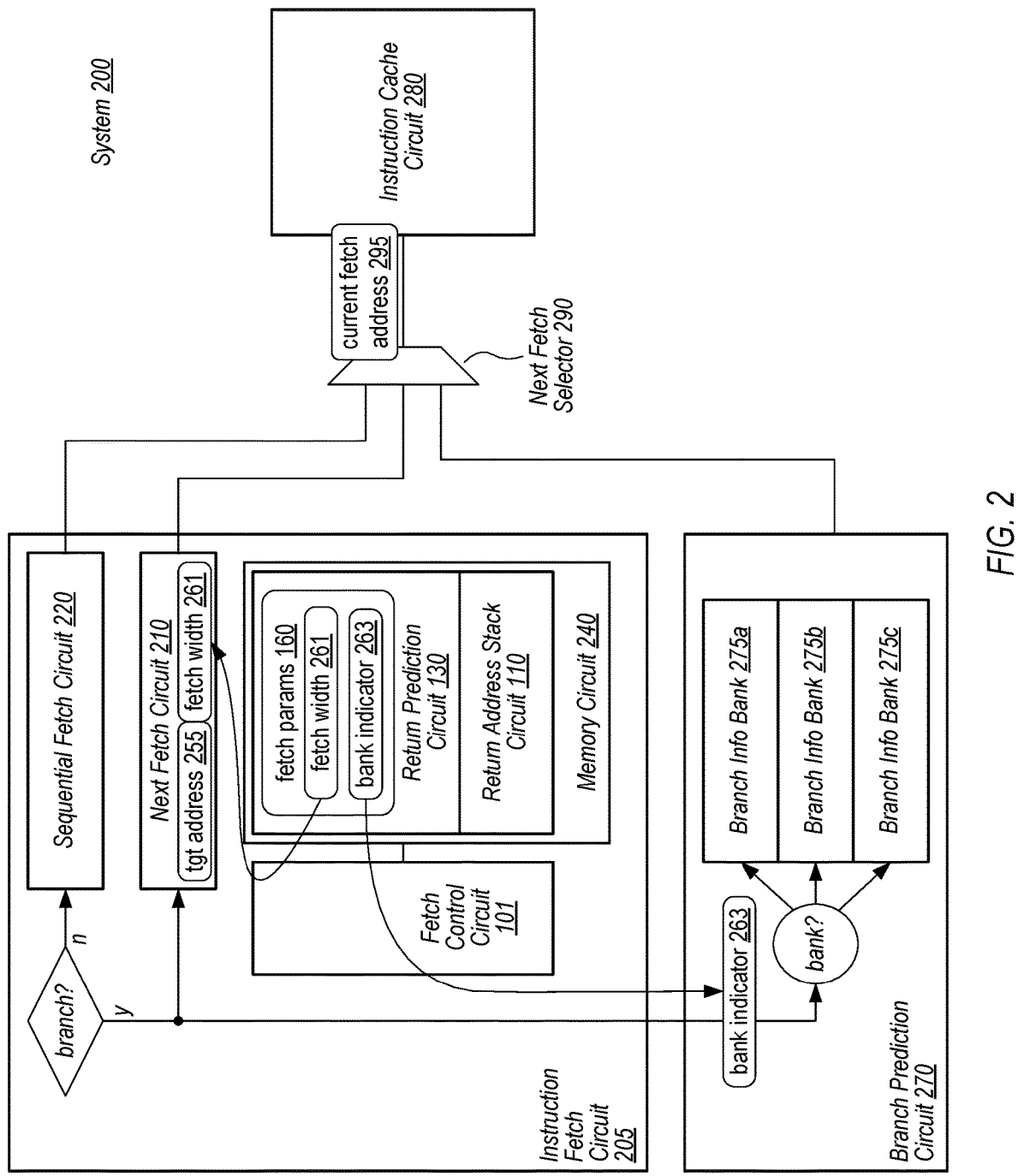
FIG. 2 shows a block diagram of an embodiment of a system with an instruction fetch circuit and a branch prediction circuit used to fetch instructions from an instruction cache.

Moving to FIG. 2, a block diagram of an embodiment of a system in which an instruction fetch circuit provides a bank indicator to a branch prediction circuit is shown. System 200 includes instruction fetch circuit 205, branch prediction circuit 270, instruction cache circuit 280, and next fetch selector 290. Instruction fetch circuit 205 includes fetch control circuit 101, return prediction circuit 130, and return address stack circuit 110 from FIG. 1. In addition, instruction fetch circuit 205 includes next fetch circuit 210, sequential fetch circuit 220, and memory circuit 240. In some embodiments, information, such as entries, associated with return prediction circuit 130 and/or return address stack circuit 110 may be stored in memory circuit 240. Branch prediction circuit 270 includes branch information banks 275a-275c (collectively branch information banks 275).

As shown, branch prediction circuit 270 includes a plurality of branch information banks 275, and is configured to store information related to previously executed branch instructions in corresponding ones of branch information banks 275. Branch prediction circuit 270 is further configured to provide a predicted direction for a fetched branch instruction. Branch prediction circuit 270 is also configured to determine if an entry associated with current fetch address 295 is included in any one or more of branch information banks 275. When a given fetch address is determined to include a conditional branch instruction, a respective entry may be created in one or more of branch information banks 275. The created entry is then used to track information indicating instances when the conditional branch instruction is taken and other instances when the conditional branch instruction is not taken.

For example, a conditional branch instruction may be used to cause a code segment to repeatedly execute a particular number of times (e.g., ten times). This repetition may be referred to as a program loop. A conditional branch instruction at the end of the program loop may cause program execution to branch back to the first instruction in the program loop while a value of a register (or memory location) is greater than zero. This register is initialized to a value of ten before the first pass through the program loop. At the end of the first pass, the register is decremented and then the conditional branch instruction is executed. A value of nine in the register causes the conditional branch instruction to be taken, resulting in the program flow returning to the beginning of the program loop. The process repeats until the value of the register is zero, at which point the conditional branch instruction is not taken and program flow continues to an instruction that comes right after the conditional branch instruction.

Branch prediction circuit 270 may be configured to track each execution of the condition branch instruction in this example, thereby determining that the conditional branch instruction is taken nine times and is not taken on the tenth execution. Each time the conditional branch instruction is taken, the corresponding entry in the one or more branch information banks 275 is updated with the result of the conditional branch, e.g., taken or not taken. Entries are stored in branch information banks 275 using the fetch address of the fetch group that includes the conditional branch instruction. Accordingly, when this fetch address is used a next time, branch prediction circuit 270 may look for an entry associated with the fetch address and provide a branch direction prediction (taken or not taken) concurrent with the fetching of the instructions.

The various ones of branch information banks 275 may be used for different reasons in various embodiments. For example, in some embodiments, entries may be assigned to a given branch information bank 275 in an ordered fashion such that entries are evenly dispersed across each of the banks 275. For example, a first fetch address that includes a conditional branch instruction may have an entry assigned to bank 275a, a subsequent fetch address with a conditional branch is assigned to bank 275b and a third fetch address with a conditional branch is then assigned to bank 275c. This process may repeat, distributing entries across each bank 275.

In other embodiments, each of branch information banks may hold a different amount of branch information for a given conditional branch instruction. For example, bank 275a may only allocate a single byte of branch information for each entry, bank 275b may allocate two bytes per entry and bank 275c may allocate four bytes per entry. For conditional branches that have a short repetitive pattern, the single byte entry in bank 275a may be adequate and no entries may be created in banks 275b and 275c. Other conditional branch instructions may have longer and/or more complicated branching patterns and therefore require two or four bytes of information to adequately capture. As branching information is collected for a given conditional branch instruction, larger entries may be created in banks 275b and/or 275c as needed.

Other techniques for using multiple branch information banks in a branch prediction circuit are contemplated. It is noted that, in the two disclosed examples, branch prediction circuit 270 may not know which one of banks 275, if any, includes an entry for a given received fetch address.

As illustrated, instruction fetch circuit 205 is configured to store, in respective entries in memory circuit 240, fetch parameters corresponding to previously accessed return addresses. In some embodiments, entries for return prediction circuit 130 are stored in memory circuit 240. For example, return prediction circuit 130 may include logic circuits that, in response to an indication that a return instruction is included in a particular fetch group, determine if an entry has been stored for the particular fetch group. In response to a determination that no entry exists, return prediction circuit 130 may, after a subsequent fetch group has been retrieved using a return address retrieved in response to the return instruction, create the entry for the return instruction using information associated with the retrieval of the subsequent fetch group using the return address. In other embodiments, fetch control circuit 101 may perform the generation of the entry and return prediction circuit 130 may be used as the storage for the entry.

In response to a fetch of a call instruction, instruction fetch circuit 205 may push a return address onto return address stack circuit 110. In some embodiments, return address stack circuit 110 includes logic circuits used to create an entry for the return address and then store the entry in a memory circuit within return address stack circuit (e.g., in a block of register circuits), or in a memory circuit external to return address stack circuit 110 (e.g., memory circuit 240). In other embodiments, fetch control circuit 101 may include the logic circuits for creating return address entries and implement return address stack circuit 110 entirely as a data structure in memory circuit 240.

In some embodiments, as described above, fetch parameters 160 may be retrieved from return prediction circuit 130 in response to the fetch of the call instruction. In such embodiments, instruction fetch circuit 205 may include fetch parameters 160 in the return address entry in return address stack circuit 110. In other embodiments, fetch parameters 160 may not be retrieved at this time.

In response to a fetch of a return instruction corresponding to the call instruction, instruction fetch circuit 205 may retrieve the return address from return address stack circuit 110. Return address stack circuit 110 may implement a stack data structure in which an entry is added by pushing the entry to the top of the stack and retrieve an entry by pulling (also referred to as "popping") the top entry off of the stack.

The return address that corresponds to the call instruction may be pulled off the top of return address stack circuit 110. If the return address stack entry includes fetch parameters 160, then fetch parameters 160 may be pulled from return address stack circuit 110 along with the return address. Otherwise, in embodiments in which fetch parameters are not included in return address stack entries, instruction fetch circuit 205 may use the pulled return address to determine if a corresponding entry exists in return prediction circuit 130. Fetch parameters 160 may then be retrieved from return prediction circuit 130 using the pulled return address.

Instruction fetch circuit 205 may send, to branch prediction circuit 270, a branch prediction request that includes the return address and fetch parameters corresponding to the return address. As shown, instruction fetch circuit 205 retrieves fetch parameters 160 from return prediction circuit 130. Fetch parameters 160 includes fetch width 261 and bank indicator 263. Fetch width 261 may be sent to next fetch circuit 210 to be used in a next fetch operation to retrieve an next fetch group from instruction cache circuit 280. Bank indicator 263 is sent to branch prediction circuit 270, along with the pulled return address. Bank indicator 263 may be indicative of a particular bank of banks 275 to be accessed in conjunction with a next fetch request using the pulled return address. By using bank indicator 263, branch prediction circuit 270 has an indication of which of banks 275 (e.g., branch information bank 275b) to access to retrieve associated conditional branch information. By accessing only the indicated one of banks 275, power and time may be reduced for retrieving the associated conditional branch information.

In some cases, branch prediction circuit 270 may determine that use of bank indicator 263 results in a failure to identify an entry in branch information bank 275b that corresponds to the pulled return address. In response to the determination, branch prediction circuit 270 may provide an indication to instruction fetch circuit 205 to update bank indicator 263 in the entry for fetch parameters 160. For example, after failing to identify a corresponding entry in branch information bank 275b, branch prediction circuit 270 may access branch information banks 275a and 275c for to identify a corresponding entry. If an entry is found in either bank, then an updated value for bank indicator 263 may be sent to instruction fetch circuit 205 to replace the incorrect value in fetch parameters 160. Otherwise, if a corresponding entry is not found for the pulled return address in any of banks 275, then a new entry may be created if applicable, and a value for bank indicator 263 is updated accordingly. If, however, an entry in banks 275 is not applicable to the return address (e.g., the instructions in the fetch group associated with the return address do not include a conditional branch instruction), then bank indicator 263 may be removed form fetch parameters 160.

It is noted that the embodiment of FIG. 2 is one depiction of an instruction fetch circuit providing bank information to a branch prediction circuit. Other embodiments, may include a different combination of circuit elements, including additional circuits. In some embodiments, for example, additional circuits may include instruction buffers, decoder circuits, one or more execution units and the like.

As previously disclosed, a return prediction circuit is described as storing fetch parameters related to various fetch addresses. FIG. 2 illustrates an example of a branch prediction bank indicator as a fetch parameter. Fetch widths are another type of fetch parameter, as is shown in FIG. 2.

Figure 3:
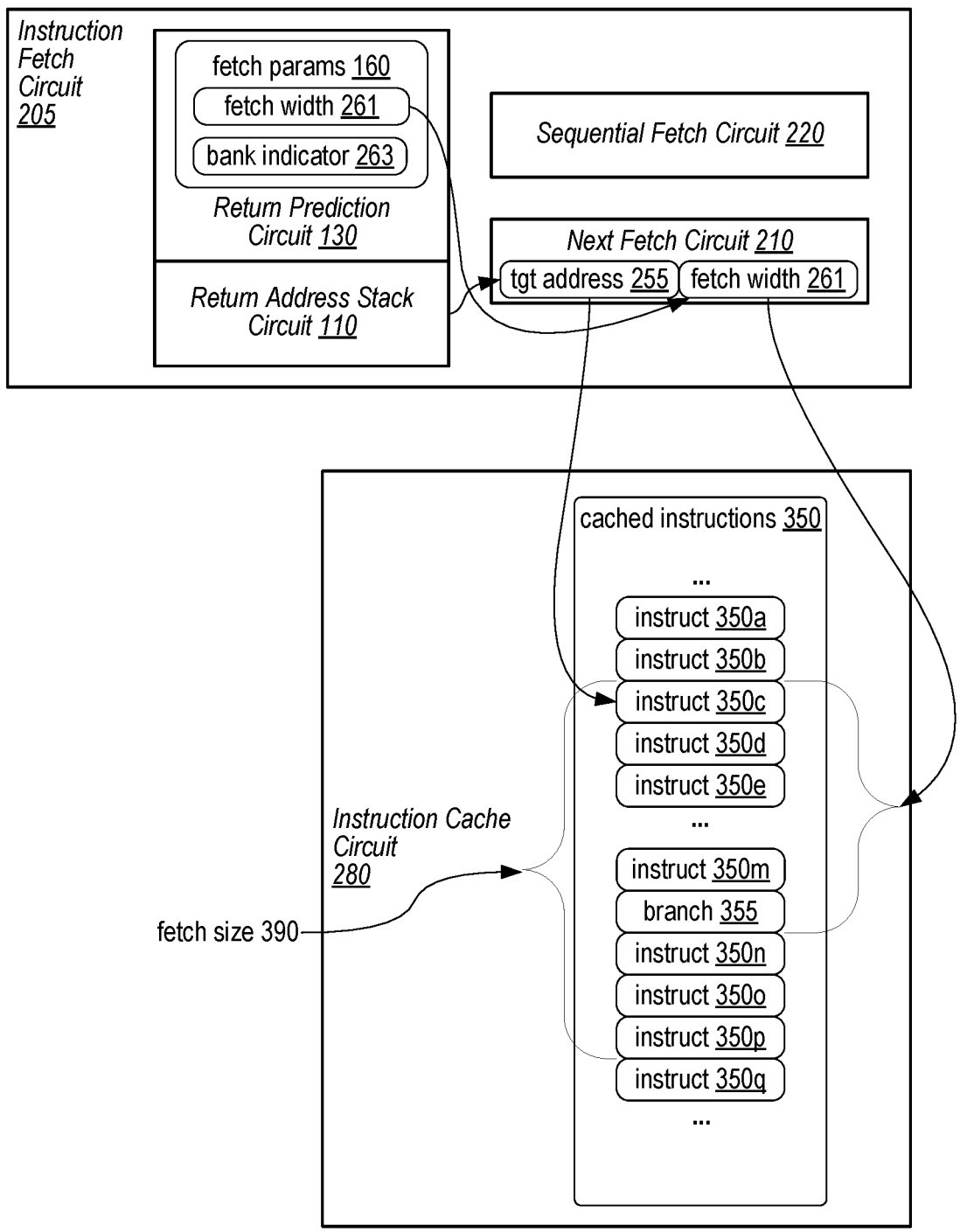
FIG. 3 depicts a block diagram of an embodiment of the system of FIG. 2 in which a next fetch prediction circuit is used to fetch a group of instructions that includes a control transfer instruction.

Turning to FIG. 3, a block diagram of an embodiment of a system with an instruction fetch circuit and an instruction cache circuit is depicted. System 200 demonstrates use of a fetch width parameter by a next fetch circuit when retrieving instructions of a fetch group from an instruction cache. System 200 includes instruction fetch circuit 205, instruction cache circuit 280, return address stack circuit, and return prediction circuit 130. Instruction fetch circuit 205 includes next fetch circuit 210 and sequential fetch circuit 220. Instruction cache circuit 280 is shown holding cached instructions 350.

As illustrated, next fetch circuit 210 may be used to determine a fetch address for a next fetch operation when a current fetch group includes control transfer instruction. Next fetch circuit 210 may determine target (tgt) address 255 based on a current fetch address. Next fetch circuit 210 may include, or have access to, memory circuits in which an entry for a current fetch address may be stored. This entry provides an indication of a fetch address to be used for the next fetch operation, e.g., target address 255. In addition, the entry may also provide fetch width 261, which may be indicative of a number of instructions to be retrieved in the next fetch request if less than a full fetch size 390 is to be retrieved.

Next fetch circuit 210 may be capable of determining target address 255 and fetch width 261 when the control transfer instruction included in the current fetch group has a fixed target address when the branch is taken. For example, a call instruction located at a given address may always branch to a same target address. A first time that this call instruction is fetched, the target address is determined and an entry associated with the fetch address for the fetch group that includes the call instruction is created and the determined target address is stored. After a subsequent fetch operation using the determined target address, another control transfer instruction may be identified. If this subsequent control transfer instruction is taken, then a fetch width may be determined that indicates a number of instructions from the target address up to, and including, the subsequent control transfer instruction. The next time the fetch group with the call instruction is fetched, the entry in next fetch circuit 210 provides the target address for the call instruction and the fetch width. This information may reduce an amount of time used to generate the subsequent fetch request.

If a fetch group includes a return instruction, however, the target address is not fixed. Instead, a return address is based on an address of a call instruction associated with the return instruction. Accordingly, next fetch circuit 210 does not, as shown, include an entry corresponding to the return instruction. Instead, instruction fetch circuit 205 pulls target address 255 from return address stack circuit 110. Fetch parameters 160 are also retrieve, as previously described, and fetch width 261 and target address 255 are used by next fetch circuit 210 to generate a next fetch request.

As illustrated, target address 255 directs instruction fetch circuit 205 to instruction (instruct) 350c stored in instruction cache circuit 280. The fetch group for this fetch request, if not limited by fetch width 261, would retrieve all instructions from instruction 350c to instruction 350p, representing a full fetch size 390. The inclusion, however, of fetch width 261 limits the fetch group to instructions from instruction 350c to branch instruction (branch) 355. The inclusion of fetch width 261 indicates that program flow may be altered after branch instruction 355 and, therefore, instructions 350n-350p may not be performed and thus do not need to be retrieved. By avoiding the retrieval of instructions 350n-350p may reduce an amount of time and power for retrieving the fetch group.

In some cases, instruction fetch circuit 205 may determine that the value of fetch width 261 results in a failure to retrieve a subsequent control transfer instruction in the corresponding fetch group (e.g., branch instruction 355). In response to the determination, instruction fetch circuit 205 may be configured to update fetch parameters 160 to correct a value of fetch width 261. For example, if fetch width 261 has an incorrect value (e.g., stopping at instruction 350m) then branch instruction 355 is missed. After determining that branch instruction 355 was not retrieved, the full fetch size 390 of the fetch group may be retrieved, thereby retrieving branch instruction 355 as well as instructions 350n-350p. An address of branch instruction 355 may then be used to determine an updated value for fetch width 261, and instruction fetch circuit 205 may replace the incorrect value of fetch width 261 with this updated value.

It is noted that FIG. 3 is merely an example for using a fetch width value when retrieving a fetch group of instructions. The block diagram is simplified to show only the described circuits. In other embodiments, system 200 may have additional circuits, including for example, a memory management circuit, and instruction decoder, and the like.

Embodiments described in regards to FIGS. 1-3 disclose use of a return prediction circuit that has an existing entry for a given return instruction. Generation of entries for the return prediction circuit may be performed using a variety of techniques. One such technique is shown in FIG. 4.

Figure 4:
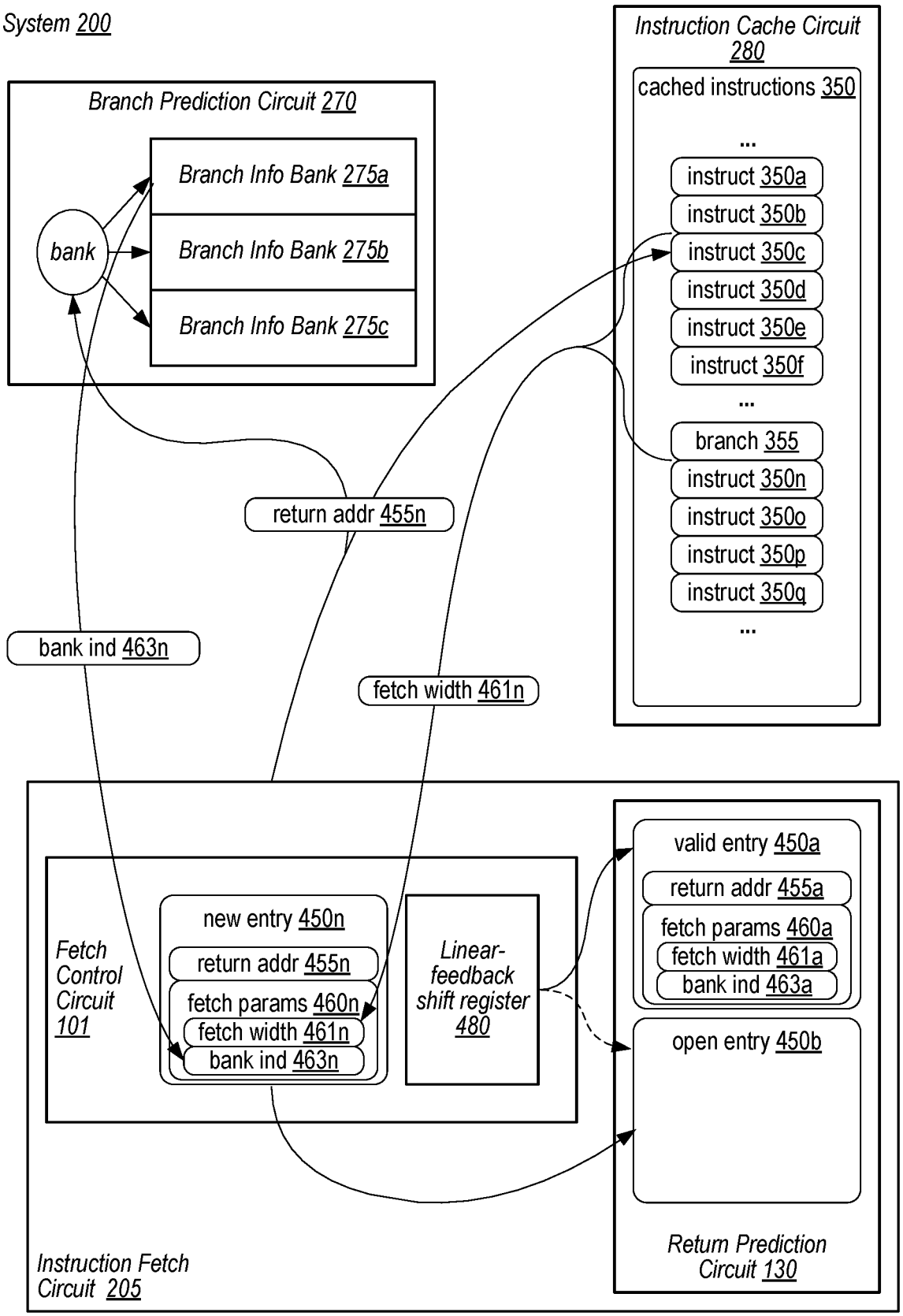
FIG. 4 illustrates a block diagram of an embodiment of the system of FIG. 2 in which a an entry in a return prediction circuit is generated.

Proceeding to FIG. 4, a block diagram of an embodiment of the system of FIG. 2 is illustrated. As shown, system 200 includes instruction fetch circuit 205, branch prediction circuit 270 and instruction cache circuit 280. Instruction fetch circuit includes fetch control circuit 101 and return prediction circuit 130. Fetch control circuit 101 includes linear-feedback shift register 480.

As illustrated, fetch control circuit 101 is further configured to, in response to a fetch of a given call instruction, determine whether an entry for a corresponding return address currently exists in return prediction circuit 130. In addition, return address 455n may be pushed onto return address stack circuit 110 (not shown in FIG. 4 for clarity). In response to a determination that a current entry does not exists, fetch control circuit 101 is also configured to generate new entry 450n for the corresponding return address 455n based on fetch parameters 460n determined when a subsequent return instruction is performed. The given call instruction directs program flow to a target of the call instruction, e.g., a program function that may be called from different call instructions throughout a program. The program function, as shown, includes a return instruction that directs program flow back to an instruction that immediately follows the given call instruction.

If the program function is being called for a first time, then an entry in return prediction circuit 130 may not have been created yet. As shown, the return instruction is processed by pulling return address 455n from return address stack circuit 110 and generating a fetch request from instruction cache circuit 280 and a branch prediction operation from branch prediction circuit 270 without benefit of a fetch width value or bank indicator. Branch prediction circuit 270 may, therefore, have to access, using return address 455n, more than one of branch information banks 275. After completing the branch prediction operation, branch prediction circuit 270 may determine a value for bank indicator (ind) 463n to associate with return address 455n. Bank indicator 463n may then be provided to fetch control circuit 101 in instruction fetch circuit 205.

Concurrently, as shown, the fetch request sent to instruction cache circuit 280 may return a full fetch group including instructions 350c through 350p, including branch instruction 355. After receiving the fetch group, instruction fetch circuit 205 may determine fetch width 461n based on return address 455n used as the fetch address and an address of branch instruction 355. Fetch control circuit 101 may create new entry 450n using fetch width 461n and bank indicator 463n as at least a portion of fetch parameters 460n.

As illustrated, fetch control circuit 101 selects an open entry (e.g., open entry 450b) in return prediction circuit 130. To select open entry 450b, fetch control circuit 101 is further configured to select, for new entry 450n, open entry 450b in return prediction circuit 130 using linear-feedback shift register 480. Linear-feedback shift register 480, as illustrated, is configured to generate one value of a predetermined sequence of values, values of the sequence corresponding to respective entries in return prediction circuit 130. Each time linear-feedback shift register 480 is used, a next value from the predetermined sequence is generated. Use of linear-feedback shift register 480 may result in a predictable distribution of entries across return prediction circuit 130.

If the value returned by linear-feedback shift register 480 points to an unavailable entry (e.g., valid entry 450a), then fetch control circuit 101 may increment (or in other embodiments, decrement) the value to determine if an adjacent entry is available. If all entries from valid entry 450a to an end (or beginning, if decrementing) of the entries are unavailable, then fetch control circuit 101 may use linear-feedback shift register to generate the next value in the sequence, and repeat the process. In other embodiments, if the end of the entries is reached, then the search may resume at the beginning of the entries.

If there are no available entries, then a count value may be decremented for one or more entries, the one or more entries selected based on the original value generated by linear-feedback shift register 480. Each entry may have a respective count value, all initialized after a system reset or initialized individually when an entry is first stored in return prediction circuit 130. If a count value for a respective valid entry reaches a threshold value (e.g., zero), then that entry may be discarded and replaced with a new entry. In some embodiments, the count value for a used entry (e.g., the return address associated with the entry is fetched) may be incremented, up to a maximum value. This may allow for frequently used entries to remain valid while the count values for less frequently used entries reach the threshold value, resulting in replacement. Accordingly, return prediction circuit 130, in some cases, may be filled with entries for the more frequently fetched return addresses, resulting in a more efficient use of the entries, rather than maintaining entries that are rarely accessed.

It is noted that the system of FIG. 4 is merely an example. The block diagram is simplified for clarity. In various embodiments, system 200 may include additional circuits, such as a return address stack circuit, execution circuits, instruction buffers, and so forth.

Figure 5:
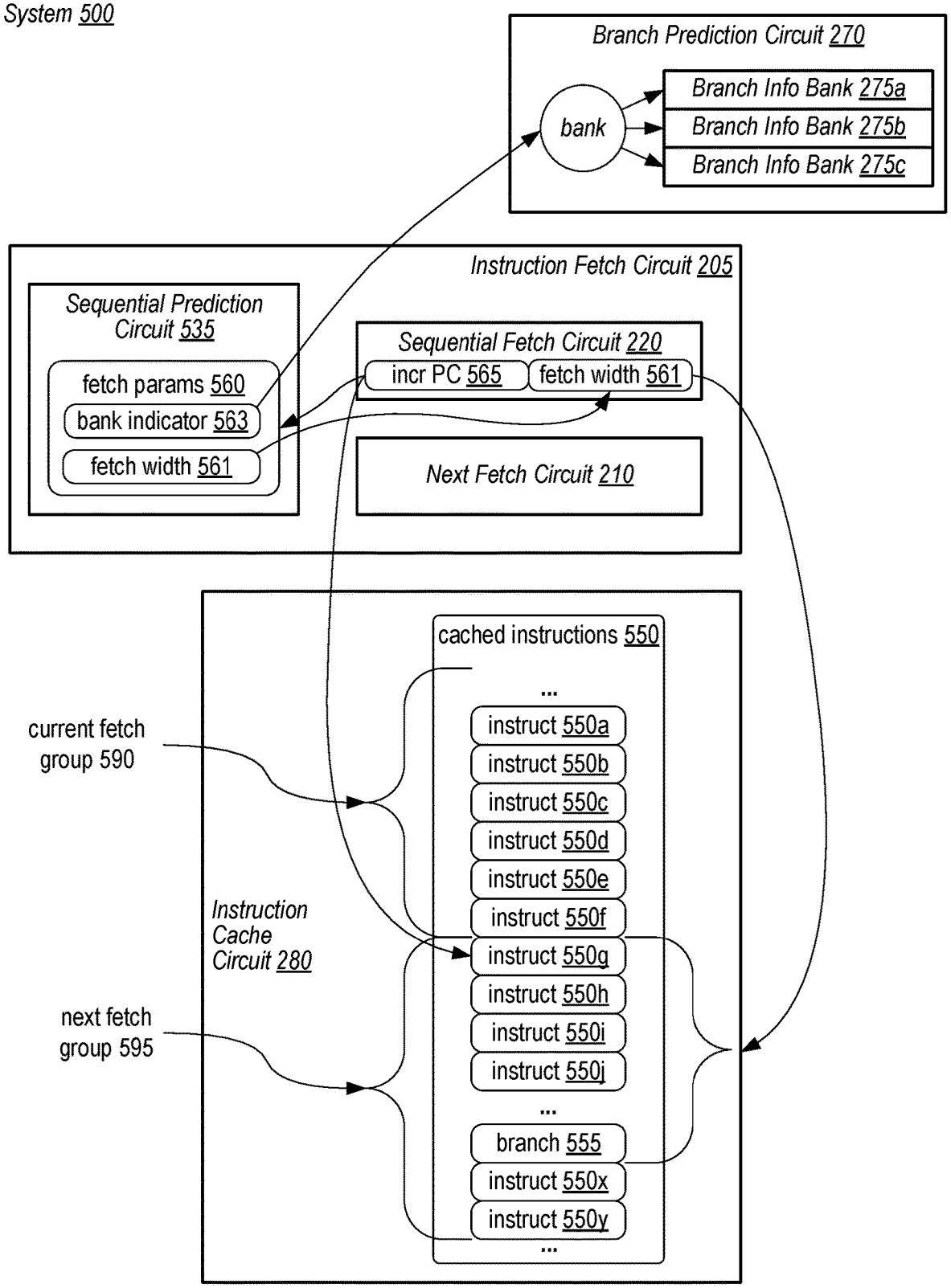
FIG. 5 shows a block diagram of an embodiment of the system of FIG. 2 in which a sequential prediction circuit is used to fetch a group of instructions that includes a control transfer instruction.

The embodiments depicted in FIGS. 1-4 disclose use of a return prediction circuit to provide fetch parameters associated with respective return instructions. Other cases in which fetch parameters may be maintained outside of a next fetch circuit are contemplated. FIG. 5 illustrates one such case.

Moving now to FIG. 5, a block diagram of an embodiment of a system in which an instruction fetch circuit provides fetch parameters in response to a sequential fetch operation is shown. System 500 includes instruction fetch circuit 205, branch prediction circuit 270, instruction cache circuit 280. Instruction fetch circuit 205 includes next fetch circuit 210 and sequential fetch circuit 220, as well as sequential prediction circuit 535. Branch prediction circuit 270 includes branch information banks 275a-275c (collectively branch information banks 275).

As described above in regards to FIG. 2, next fetch circuit 210 is used to determine a next fetch address and associated fetch parameters when a current fetch group includes a taken control transfer instruction. If however, the current fetch group does not include a taken control transfer instruction, then sequential fetch circuit 220 is used to generate a next fetch address.

As illustrated, current fetch group 590 does not include any control transfer instructions. Current fetch group 590, therefore, may be a full-size fetch group, e.g., with a maximum fetch width. As a next fetch address, sequential fetch circuit 220 may use incremented program counter (incr PC) 565. Sequential fetch circuit may increment a current program counter value with the value of a maximum fetch width. Accordingly, the next fetch address (incremented PC 565) points to an instruction immediately following a last instruction of the current fetch group.

Since next fetch circuit 210 is not used, fetch parameters cannot be provided from next fetch circuit 210 or from a return prediction circuit. Without fetch parameters for incremented PC 565, a next fetch request will retrieve next fetch group 595 using a maximum fetch width and will access all banks 275 of branch prediction circuit 270. As shown, next fetch group 595 includes branch instruction (branch) 555, which may result in instructions (instruct) 550x and 550y being unnecessarily retrieved, potentially wasting bandwidth and power in system 500.

In order to provide fetch parameters for a sequential fetch group, instruction fetch circuit 205 includes sequential prediction circuit 535 that is configured to store, for a sequential fetch address (e.g., incremented PC 565), sequential fetch parameters 560 for a subsequent fetch request. In response to an initial fetch operation using incremented PC 565, instruction fetch circuit 205 (in some embodiments, using fetch control circuit 101) is further configured to determine fetch parameters 560 associated with the retrieval of instructions from incremented PC 565. In response to a determination that at least one of the determined fetch parameters 560 satisfies a particular condition, instruction fetch circuit 205 is also configured to store fetch parameters 560 in an entry in sequential prediction circuit 535. Various conditions to be satisfied may include: that next fetch group 595 includes a control transfer instruction; that the fetch width is less than a particular value; and that only a particular number of banks 275 of branch prediction circuit 270 are accessed for next fetch group 595.

At a later point in time, after fetch parameters 560 have been stored in sequential prediction circuit 535, instruction fetch circuit 205 is further configured to determine that a next fetch address is incremented PC 565. Instruction fetch circuit 205, knowing that incremented PC 565 was received from sequential fetch circuit 220, may also be configured to look for an entry in sequential prediction circuit 535 corresponding to incremented PC 565. In response to a determination that fetch parameters 560 have been stored and correspond to incremented PC 565, instruction fetch circuit 205 is further configured to create, using fetch parameters 560 and incremented PC 565, a next fetch request to retrieve instructions starting at incremented PC 565. Fetch width 561 may be used to avoid retrieving instructions 550x and 550y, while bank indicator 563 may provide an indication of which of banks 275 to be accessed in branch prediction circuit 270.

It is noted that fetch parameters 560 may be stored into a particular entry in sequential prediction circuit 535 using similar techniques as described above for the return prediction circuit 130. Referring to the description related to FIG. 4, a linear-shift feedback register may be used to select a particular entry in sequential prediction circuit 535. If the selected entry is unavailable, instruction fetch circuit 205 may advance through the subsequent entries until an available entry is identified. If no entries are available, then associated count values for one or more of the entries may be adjusted. If an adjusted value reaches a threshold value, then the corresponding entry may be discarded and replaced with a new entry.

It is further noted that system 500 of FIG. 5 is an example for describing the disclosed techniques. The block diagram is simplified for clarity. In other embodiments, system 500 may include additional circuits, such as a return address stack circuit, a return prediction circuit, fetch control circuit, and the like.

To summarize, various embodiments of a system that includes a return prediction circuit and/or a sequential prediction circuit are disclosed. Broadly speaking, apparatus, systems, and methods are contemplated in which an embodiment of an apparatus, for example, an apparatus includes a processor circuit that includes a return address stack circuit, a return prediction circuit, and a fetch control circuit. The return prediction circuit is configured to store, for previously accessed return addresses, fetch parameters for next fetch addresses. The fetch control circuit is configured to in response to a fetch of a call instruction, push a return address onto the return address stack circuit. In response to a fetch of a return instruction that corresponds to the call instruction, the fetch control circuit is further configured to retrieve the return address from the return address stack circuit, and to create, using the return address and fetch parameters retrieved from the return prediction circuit, a next fetch request to retrieve instructions subsequent to the return instruction.

In a further example, the fetch control circuit may be further configured to retrieve the fetch parameters from the return prediction circuit in response to the fetch of the return instruction. In another example, the fetch control circuit may be further configured to, in response to the fetch of the call instruction, retrieve the fetch parameters from the return prediction circuit and push the fetch parameters onto the return address stack circuit. In an example, the fetch control circuit may be further configured, in response to a fetch of a given call instruction, to determine whether an entry for a corresponding return address currently exists in the return prediction circuit. In response to a determination that a current entry does not exists, the fetch control circuit may also be configured to generate the entry for the corresponding return address based on fetch parameters determined when a subsequent return instruction is performed.

In one example, the fetch control circuit may be further configured to select, for the generated entry, a particular entry space in the return prediction circuit using a linear-feedback shift register. In another example, the fetch parameters may include a fetch width that is indicative of a number of instructions to be retrieved in the next fetch request. In an embodiment, the apparatus may further comprise a branch predictor circuit, including a plurality of banks. The branch predictor circuit may be configured to store information related to previously executed branch instructions in corresponding ones of the plurality of banks. The fetch parameters may include a bank value indicative of a particular bank of the plurality of banks to be accessed in the next fetch request.

In another example, the apparatus may further comprise a sequential prediction circuit that is configured to store, for a sequential fetch address, sequential fetch parameters for use in a subsequent fetch request. The fetch control circuit may be further configured to determine that a next fetch address is the sequential fetch address. In response to a determination that the sequential prediction circuit includes an entry for the sequential fetch address, the fetch control circuit may also be configured to create, using the sequential fetch parameters retrieved from the sequential prediction circuit, a next fetch request to retrieve instructions starting at the sequential fetch address. In a further example, the fetch control circuit may be further configured, in response to an initial fetch operation using the sequential fetch address, to determine the sequential fetch parameters associated with the retrieval of instructions from the sequential fetch address. In response to a determination that at least one of the determined sequential fetch parameters satisfies a particular condition, the fetch control circuit may also be configured to store the sequential fetch parameters in an entry in the sequential prediction circuit.

Another example of a disclosed system includes a branch predictor circuit and an instruction fetch circuit. The branch predictor circuit may be configured to provide a predicted direction for a fetched branch instruction. The instruction fetch circuit may be configured to store, in respective entries in a memory circuit, fetch parameters corresponding to previously accessed return addresses. In response to a fetch of a call instruction, the instruction fetch circuit may be configured to push a return address onto a return address stack. In response to a fetch of a return instruction corresponding to the call instruction, the instruction fetch circuit may be configured to retrieve the return address from the return address stack, and to send, to the branch prediction circuit, a branch prediction request that includes the return address and fetch parameters corresponding to the return address.

In a further example, the return address stack may be stored in the memory circuit. In another example, a particular fetch parameter entry includes an indicator of a particular memory bank to use for determining a subsequent fetch address. The branch predictor circuit may be further configured to determine that the indicator results in a failure to identify an entry in the particular memory bank corresponding to the return address and, in response to the determination, to provide an indication to instruction fetch circuit to update the particular fetch parameter entry. In one example, a particular fetch parameter entry includes a value of a fetch width used to indicate a control transfer instruction in a corresponding fetch group. The instruction fetch circuit may be further configured to determine that the value of the fetch width results in a failure to retrieve a subsequent control transfer instruction in the corresponding fetch group. In response to the determination, the instruction fetch circuit may be configured to update the particular fetch parameter entry.

In another example, the instruction fetch circuit may be further configured to store sequential fetch parameters corresponding to a previously accessed sequential fetch address, and to determine that a next fetch address is the sequential fetch address. In response to a determination that the sequential fetch parameters have been stored, the instruction fetch circuit may be further configured to create, using the sequential fetch parameters, a next fetch request to retrieve instructions starting at the sequential fetch address.

The circuits and techniques described above in regards to FIGS. 1-5 may be performed using a variety of methods. Two methods associated with use of a return prediction circuit are described below in regards to FIGS. 6 and 7. Two additional methods associated with use of a sequential prediction circuit are described below in regards to FIGS. 8 and 9.

Turning now to FIG. 6, a flow diagram for an embodiment of a method for using a return prediction circuit is illustrated. Method 600 may be used in conjunction with any of the computer circuitry, systems, devices, elements, or components disclosed herein, such as systems 100a, 100b, and 200, among others. Method 600 is described below using system 100a of FIG. 1 as an example. References to elements in FIG. 1 are included as non-limiting examples.

As illustrated, method 600 begins in block 610 by storing, by a fetch control circuit, fetch parameters in a return prediction circuit, wherein the fetch parameters correspond to previously accessed return addresses. As described above, fetch parameters 160 may be stored in return prediction circuit 130 in response to determining that call instruction 150 is included within an initial retrieval of fetched instructions 140. Fetch control circuit 101 may determine that fetch parameters have not been stored in return prediction circuit 130. After retrieving return instruction 170, parameters associated with return instruction 170 may be determined and then stored in an entry in return prediction circuit 130. Additional details regarding the storing of fetch parameters 160 are provided below, in the description of FIG. 7.

In response to fetching a call instruction, method 600 continues in block 620 by pushing, by the fetch control circuit, a return address onto a return address stack circuit. In a subsequent retrieval of fetched instructions 140, call instruction 150 may be determined to be included within the fetched instructions. In response to the inclusion, return address 155 is pushed, by fetch control circuit 101, onto return address stack circuit 110 for later retrieval when a corresponding return instruction is fetched.

In response to fetching a return instruction corresponding to the call instruction, method 600 continues in block 630 by retrieving a fetch group using return address 155. After performing call instruction 150, program flow may transfer to a target address indicated by call instruction 150. Program flow may eventually be transferred back to an instruction immediately following call instruction 150 by performing a corresponding return instruction. As shown, retrieving the fetch group using the return address includes two sub-blocks.

At sub-block 634, retrieving the fetch group includes retrieving, by the fetch control circuit, the return address from the return address stack circuit. As shown, when fetched instructions 145 is retrieved, return instruction 170 is determined to be included causing fetch control circuit 101 to retrieve return address 155 from return address stack circuit 110. In system 100a, fetch parameters 160 are retrieved from return prediction circuit 130 in response to the fetch of call instruction 150. Fetch parameters 160 are then pushed, along with return address 155, onto return address stack circuit 110. When return address 155 is pulled from return address stack circuit 110, fetch parameters 160 are also pulled.

In other embodiments, such as system 100b, method 600 includes retrieving fetch parameters 160 from return prediction circuit 130 in response to the fetching of return instruction 170. In such embodiments, only return address 155 is pushed onto return address stack circuit 110 when call instruction 150 is fetched. When return instruction 170 is fetched, return address 155 is pulled from return address stack circuit 110 and then used to retrieve fetch parameters 160 from return prediction circuit 130.

At sub-block 638, retrieving the fetch group using the return address includes creating, by the fetch control circuit using the return address and fetch parameters retrieved from the return prediction circuit, a next fetch request to retrieve instructions subsequent to the return instruction. As illustrated, fetch request 175 is generated using return address 155 and fetch parameters 160. As described above, fetch parameters 160 may include, for example, a fetch width and bank indicators. The fetch width may locate a control transfer instruction within the subsequent fetch group, allowing instruction only instructions from return address 155 to the control transfer instruction to be retrieved. Instructions coming after the control transfer instruction may be ignored, potentially saving time and power by not retrieving these instructions.

It is noted that the method of FIG. 6 includes elements 610-638. Method 600 may end in sub-block 638 or may repeat some or all blocks of the method. For example, method 600 may return to block 620 in response to retrieving a next call instruction, or to block 610 in response to an initial fetch of a call instruction. In some cases, method 600 may be performed concurrently with other instantiations of the method. For example, some programs may include nested call instructions where a second call instruction is fetched after a first call instruction, and before a return instruction corresponding to the first call instruction. In such a case, a second instantiation of method 600 (or a portion thereof) may be performed, for example, between blocks 620 and 630 of the first instantiation.

Proceeding now to FIG. 7, a flow diagram for an embodiment of a method for generating an entry for a return prediction circuit is illustrated. Similar to method 600, method 700 may be used in conjunction with any of the computer circuitry, systems, devices, elements, or components disclosed herein, such as systems 100a, 100b, and 200, among others. In some embodiments, method 700 may correspond to, or be included in, operations of block 610 of method 600. Method 700 is described below using system 200 of FIG. 4 as an example. References to elements in FIG. 4 are included as non-limiting examples.

As illustrated, method 700 begins in block 710 by, in response to a fetch of a given call instruction, determining whether an entry for a corresponding return address currently exists in the return prediction circuit. Instruction fetch circuit 205 retrieves a fetch group that includes a call instruction, causing a return address 455a to be determined using an address of an instruction following the call instruction. The fetch of the call instruction also causes fetch control circuit 101 to access return prediction circuit 130, using the determined return address 455a as an index. If an entry exists, then method 700 may end. Otherwise, method 700 proceeds to block 720.

In response to determining that a current entry does not exists, method 700 continues in block 720 by generating an entry for the corresponding return address based on fetch parameters determined when a subsequent return instruction is performed. Since fetch parameters are based on identifying a subsequent control transfer instruction in a fetch group that is retrieved using return address 455a, fetch control circuit 101 may monitor subsequent fetch requests until the corresponding return instruction is fetched, and a corresponding return fetch group is retrieved using return address 455*a*. Fetch parameters 460*n* for the return fetch group, including fetch width 461*n* and bank indicator 463*n*, may be determined based on decoding of instructions of the return fetch group. These fetch parameters 460*n* may be associated with return address 455*n* in a new entry 450*n*.

Method 700 may continue at block 730 by selecting, by the fetch control circuit for the generated entry, a particular entry space in the return prediction circuit using a linear-feedback shift register. After fetch control circuit 101 determines values for the respective fetch parameters 460*n*, an entry in return prediction circuit 130 is selected for storing new entry 450*n*. In various embodiments, fetch control circuit 101 may use any suitable technique for selecting an entry in return prediction circuit 130 for storing fetch parameters 460*n*. As shown, linear-feedback shift register 480 is used to generate a value that fetch control circuit 101 uses to select an available entry. Starting with an entry corresponding to the generated value, fetch control circuit 101 indexes through the entries until open entry 450*b* is identified.

At block 740, operation of method 700 may depend on whether fetch control circuit 101 determines if an entry in return prediction circuit 130 is available. If open entry 450*b* is available, then method 700 proceeds to block 760 to store new entry 450*n*. Otherwise, method 700 proceeds to block 750 to adjust counter values.

Method 700 continues at block 750 by adjusting, by the fetch control circuit using a particular amount, a respective counter for a selected entry of the return prediction circuit. When an entry is created in return prediction circuit 130, a respective counter may be initialized to a starting value. In response to determining that there are no available entries in return prediction circuit 130, fetch control circuit 101 identifies one or more counters to adjust (e.g., increment or decrement), the counters being selected based on the value generated by linear-feedback shift register 480. If the adjusting results in any of the one or more adjusted counters reaching a final value, then an entry corresponding to a counter with a final value may selected for replacement. Otherwise, new entry 450*n* may be discarded.

In response to determining that the respective counter has a particular value, method 700 continues at block 760 by replacing fetch parameters in the selected entry with the determined fetch parameters for the subsequent return instruction. If the selected entry, e.g., open entry 450*b*, has a final counter value, then any fetch parameters currently stored in open entry 450*b* may be overwritten with fetch parameters 460*n*. Open entry 450*b* may further be associated with return address 455*n* such that if fetch control circuit 101 accesses return prediction circuit 130 using return address 455*n*, fetch parameters 460*n* are retrieved. For example, return prediction circuit 130 may be implemented using a content-addressable memory (CAM), or other suitable implementation.

It is noted that method 700 includes elements 710-760. Method 700 may end in block 760 or may repeat some or all blocks of the method. For example, method 700 may return to block 710 in response to a subsequent fetch of a different call instruction. In some cases, method 700 may be performed concurrently with other instantiations of the method. For example, the different call instruction may be fetched while fetch parameters for the new entry for the first call instruction are still being determined. In such a case, a second instantiation of method 700 (or a portion thereof) may be performed, for example, while block 720 of the first instantiation is in progress.

Figure 8:
FIG. 8 shows a flow diagram of an embodiment of a method for retrieving a fetch group using an entry from a sequential prediction circuit.

Moving to FIG. 8, a flow diagram for an embodiment of a method for using a sequential prediction circuit is illustrated. In a similar manner as methods 600 and 700, method 800 may be used in conjunction with any of the computer circuitry, systems, devices, elements, or components disclosed herein, such as system 500, or others. Method 800 is described below using system 500 of FIG. 5 as an example. References to elements in FIG. 5 are included as non-limiting examples.

As illustrated, method 800 begins in block 810 by storing, by a fetch control circuit in a sequential prediction circuit, fetch parameters corresponding to previously accessed sequential fetch addresses. As illustrated, sequential fetch circuit 220 is used to increment a current program counter value (incremented PC 565) to generate a next fetch address for a sequential fetch group. Sequential fetch circuit 220 does not maintain fetch parameters associated with a previously fetched sequential fetch group. To provide such fetch parameters, instruction fetch circuit 205 includes sequential prediction circuit 535. In response to an initial fetch operation using incremented PC 565, associated fetch parameters 560 are determined based on the retrieval of instructions from incremented PC 565. As previously described, fetch parameters 560 may be stored in sequential prediction circuit 535 in response to a determination that at least one of the determined fetch parameters 560 satisfies a particular condition.

Method 800 may continue at 820 by determining that a fetch address for a subsequent fetch request is a sequential fetch address. Instruction fetch circuit 205 may know that incremented PC 565 was received from sequential fetch circuit 220 based on how a next fetch address is received. For example, referring back to FIG. 2, next fetch selector 290 may include multiplexing circuitry to select a particular address from various sources, including from sequential fetch circuit 220, from next fetch circuit 210, or from branch prediction circuit 270. A control signal may be used to enable the particular selection. This control signal, therefore, may further be used by instruction fetch circuit 205 to determine that a received next fetch address is from sequential fetch circuit 220. In response to this determination, instruction fetch circuit 205 may also be configured to look in sequential prediction circuit 535 for an entry corresponding to incremented PC 565.

At 830, method 900 continues by, in response to determining that a sequential prediction circuit includes an entry for the sequential fetch address, creating, by the fetch control circuit using sequential fetch parameters retrieved from the sequential prediction circuit, a next fetch request to retrieve instructions starting at the sequential fetch address. For example, fetch parameters 560 may be retrieved from sequential prediction circuit 535 and combined with incremented PC 565 to generate a next fetch request to retrieve instructions starting at incremented PC 565. As shown in FIG. 5, instructions 550*x* and 550*y* may be excluded from the resulting fetch group based on fetch width 561, while bank indicator 563 may provide an indication of which of banks 275 to be accessed in branch prediction circuit 270. Such actions may save time and power by avoiding retrieval of unused instructions and access only ones of banks 275 that may have information related to any control transfer instructions within the resulting fetch group.

It is noted that the method of FIG. 8 includes elements 810-830. Method 800 may end in block 830 or may repeat some or all blocks of the method. For example, method 800 may return to block 820 in response to a receiving a subsequent fetch address from sequential fetch circuit 220.

In some cases, method 800 may be performed concurrently with other instantiations of itself or the other disclosed methods. For example, system 500 may include a multi-core processor and/or a multi-threaded processor core, in which case, two processor cores, or two threads in a single multi-threaded core may prepare fetch requests for different streams of instructions concurrently. Two instances of method 800 may, therefore be performed by the two cores (or the multi-threaded core) in an overlapping manner.

Turning to FIG. 9, a flow diagram for an embodiment of a method for generating an entry for a sequential prediction circuit is illustrated. Similar to other methods, method 900 may be used in conjunction with any of the computer circuitry, systems, devices, elements, or components disclosed herein, including for example, system 500 of FIG. 5. In some embodiments, method 900 may correspond to, or be included in, operations of block 810 of method 800. Method 900 is described below using system 500 of FIG. 5 as an example. References to elements in FIG. 5 are included as non-limiting examples.

As illustrated, method 900 begins at block 910 by, in response to an initial fetch operation using a sequential fetch address, determining, by the fetch control circuit, the sequential fetch parameters associated with the retrieval of instructions from the sequential fetch address. For example, instruction fetch circuit 205 receives, from sequential fetch circuit 220, incremented PC 565 as a fetch address for a next fetch request. Instruction fetch circuit 205 accesses sequential prediction circuit 535 using incremented PC 565 as an index. If an entry exists, then method 900 may end. Otherwise, a new entry for sequential prediction circuit 535 is created. Since fetch parameters are based on identifying a subsequent control transfer instruction in a fetch group that is retrieved using incremented PC 565, instruction fetch circuit 205 (e.g., using fetch control circuit 101 of FIGS. 1 and 2) may monitor a retrieval of a corresponding sequential fetch group retrieved using incremented PC 565. Fetch parameters 560 for the sequential fetch group, including fetch width 561 and bank indicator 563, may be determined based on decoding of instructions of the sequential fetch group. These sequential fetch parameters 560 may be associated with incremented PC to generate a new sequential prediction circuit entry.

In response to determining that at least one of the determined sequential fetch parameters satisfies a particular condition, method 900 may continue at block 920 by selecting, by the fetch control circuit for the generated entry, a particular entry space in the sequential prediction circuit. After in fetch control circuit 101 determines values for the respective fetch parameters 560, an entry in sequential prediction circuit 535 is selected for storing the new entry. In various embodiments, fetch control circuit 101 may use any suitable technique for selecting an entry in sequential prediction circuit 535 for storing fetch parameters 560. For example, linear-feedback shift register 480 of FIG. 4 may be used to generate a value that fetch control circuit 101 uses to select an available entry. In other embodiments, the initial entry selection may progress linearly through the entries of sequential prediction circuit 535, or may be selected using a random (or pseudo-random) number generator circuit. Starting with the selected entry, fetch control circuit 101 may index through entries of sequential prediction circuit 535 until an open entry is identified.

At block 930, operation of method 900 may depend on whether an entry in the sequential prediction circuit is available. If an open entry is available, then method 900 proceeds to block 950 to store the new entry. Otherwise, method 900 proceeds to block 940 to adjust counter values.

Method 900 continues at block 940 by adjusting, by the fetch control circuit using a particular amount, a respective counter for a selected entry of the sequential prediction circuit. In a manner similar to that described above for return prediction circuit 130, when an entry is created in sequential prediction circuit 535, a respective counter may be initialized to a starting value. In response to determining that there are no available entries in sequential prediction circuit 535, fetch control circuit 101 identifies one or more counters to adjust (e.g., increment or decrement), the counters being selected based on the initially selected entry. If the adjusting results in any of the one or more adjusted counters reaching a final value, then an entry corresponding to a counter with a final value may selected for replacement. Otherwise, the new entry may be discarded.

In response to determining that the respective counter has a particular value, method 900 continues at block 950 by replacing the fetch parameters in the selected entry with the determined fetch parameters for the sequential fetch address. If the selected entry, has a final counter value, then any currently stored fetch parameters may be overwritten with fetch parameters 560. The selected entry may be associated with incremented PC 565 such that if instruction fetch circuit 205 accesses sequential prediction circuit 535 using incremented PC 565, fetch parameters 560 are retrieved. In a similar manner as return prediction circuit 130, sequential prediction circuit 535 may also be implemented using a CAM, or other suitable implementation.

It is noted that method 900 includes elements 910-950. Method 900 may end in block 950 or may repeat some or all blocks of the method. For example, method 900 may return to block 910 in response to receiving a another sequential fetch request. Any of the disclosed methods may be performed concurrently with other instantiations of itself or the other disclosed methods.

Figure 10:
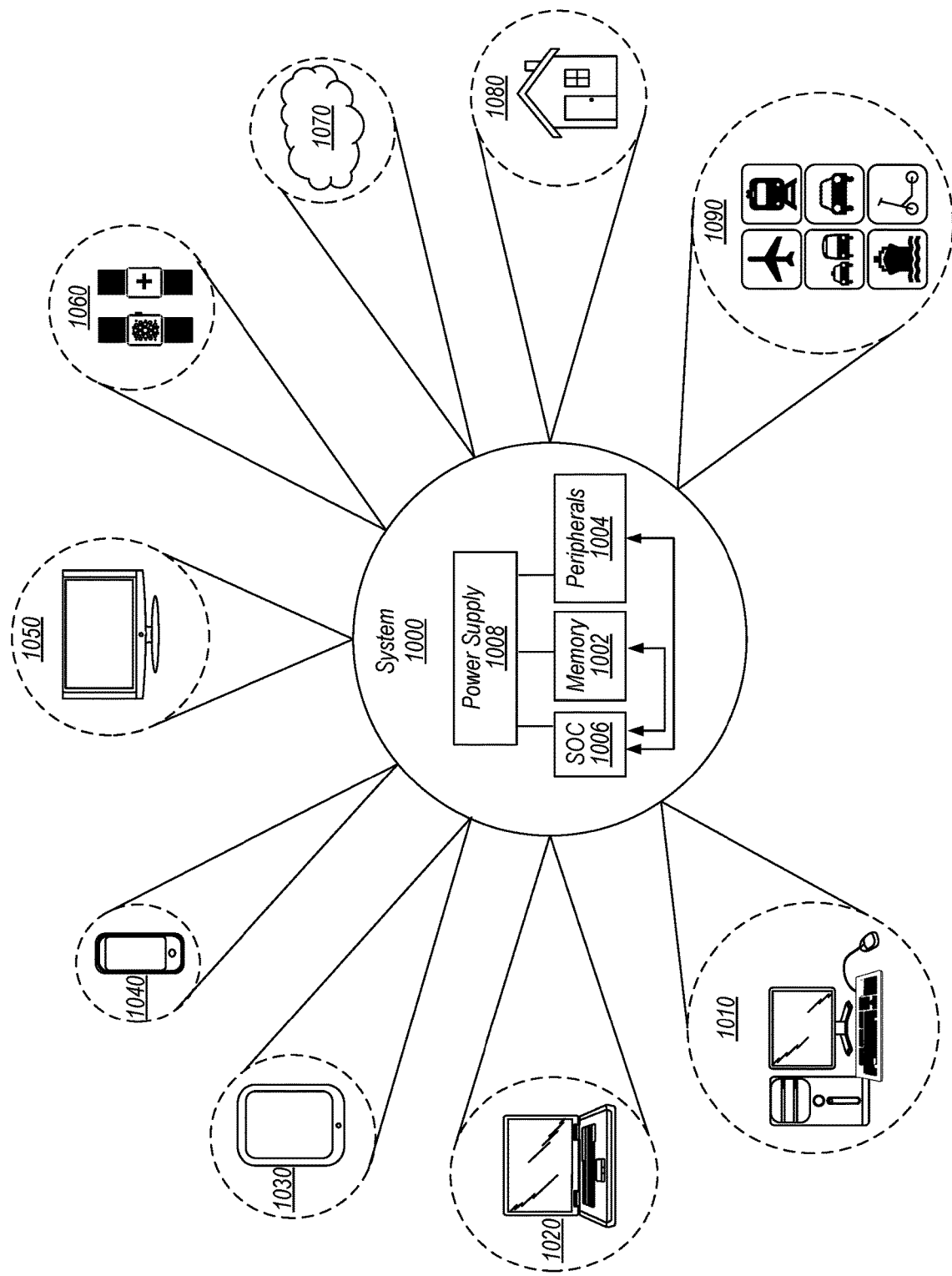
FIG. 10 illustrates various embodiments of systems that include integrated circuits that utilize the disclosed techniques.

FIGS. 1-9 illustrate circuits and methods for a system, such as an integrated circuit, that includes a return prediction circuit and/or a sequential prediction circuit. Any embodiment of the disclosed systems may be included in one or more of a variety of computer systems, such as a desktop computer, laptop computer, smartphone, tablet, wearable device, and the like. In some embodiments, the circuits described above may be implemented on a system-on-chip (SoC) or other type of integrated circuit. A block diagram illustrating an embodiment of computer system 1000 is illustrated in FIG. 10. Computer system 1000 may, in some embodiments, include any disclosed embodiment of system 100a, 100b, 200, or 500.

In the illustrated embodiment, the system 1000 includes at least one instance of a system on chip (SoC) 1006 which may include multiple types of processor circuits, such as a central processing unit (CPU), a graphics processing unit (GPU), or otherwise, a communication fabric, and interfaces to memories and input/output devices. One or more of these processor circuits may correspond to an instance of the systems disclosed herein. In various embodiments, SoC 1006 is coupled to external memory circuit 1002, peripherals 1004, and power supply 1008.

A power supply 1008 is also provided which supplies the supply voltages to SoC 1006 as well as one or more supply voltages to external memory circuit 1002 and/or the peripherals 1004. In various embodiments, power supply 1008 represents a battery (e.g., a rechargeable battery in a smart phone, laptop or tablet computer, or other device). In some embodiments, more than one instance of SoC 1006 is included (and more than one external memory circuit 1002 is included as well).

External memory circuit 1002 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. In some embodiments, external memory circuit 1002 may include non-volatile memory such as flash memory, ferroelectric random-access memory (FRAM), or magnetoresistive RAM (MRAM). One or more memory devices may be coupled onto a circuit board to form memory modules such as single inline memory modules (SIMMs), dual inline memory modules (DIMMs), etc. Alternatively, the devices may be mounted with a SoC or an integrated circuit in a chip-on-chip configuration, a package-on-package configuration, or a multi-chip module configuration.

The peripherals 1004 include any desired circuitry, depending on the type of system 1000. For example, in one embodiment, peripherals 1004 includes devices for various types of wireless communication, such as Wi-Fi, Bluetooth, cellular, global positioning system, etc. In some embodiments, the peripherals 1004 also include additional storage, including RAM storage, solid state storage, or disk storage. The peripherals 1004 include user interface devices such as a display screen, including touch display screens or multi-touch display screens, keyboard or other input devices, microphones, speakers, etc.

As illustrated, system 1000 is shown to have application in a wide range of areas. For example, system 1000 may be utilized as part of the chips, circuitry, components, etc., of a desktop computer 1010, laptop computer 1020, tablet computer 1030, cellular or mobile phone 1040, or television 1050 (or set-top box coupled to a television). Also illustrated is a smartwatch and health monitoring device 1060. In some embodiments, the smartwatch may include a variety of general-purpose computing related functions. For example, the smartwatch may provide access to email, cellphone service, a user calendar, and so on. In various embodiments, a health monitoring device may be a dedicated medical device or otherwise include dedicated health related functionality. In various embodiments, the above-mentioned smartwatch may or may not include some or any health monitoring related functions. Other wearable devices 1060 are contemplated as well, such as devices worn around the neck, devices attached to hats or other headgear, devices that are implantable in the human body, eyeglasses designed to provide an augmented and/or virtual reality experience, and so on.

System 1000 may further be used as part of a cloud-based service(s) 1070. For example, the previously mentioned devices, and/or other devices, may access computing resources in the cloud (i.e., remotely located hardware and/or software resources). Still further, system 1000 may be utilized in one or more devices of a home 1080 other than those previously mentioned. For example, appliances within the home may monitor and detect conditions that warrant attention. Various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 10 is the application of system 1000 to various modes of transportation 1090. For example, system 1000 may be used in the control and/or entertainment systems of aircraft, trains, buses, cars for hire, private automobiles, waterborne vessels from private boats to cruise liners, scooters (for rent or owned), and so on. In various cases, system 1000 may be used to provide automated guidance (e.g., self-driving vehicles), general systems control, and otherwise.

It is noted that the wide variety of potential applications for system 1000 may include a variety of performance, cost, and power consumption requirements. Accordingly, a scalable solution enabling use of one or more integrated circuits to provide a suitable combination of performance, cost, and power consumption may be beneficial. These and many other embodiments are possible and are contemplated. It is noted that the devices and applications illustrated in FIG. 10 are illustrative only and are not intended to be limiting. Other devices are possible and are contemplated.

As disclosed in regards to FIG. 10, computer system 1000 may include one or more integrated circuits included within a personal computer, smart phone, tablet computer, or other type of computing device. A process for designing and producing an integrated circuit using design information is presented below in FIG. 11.

Figure 11:
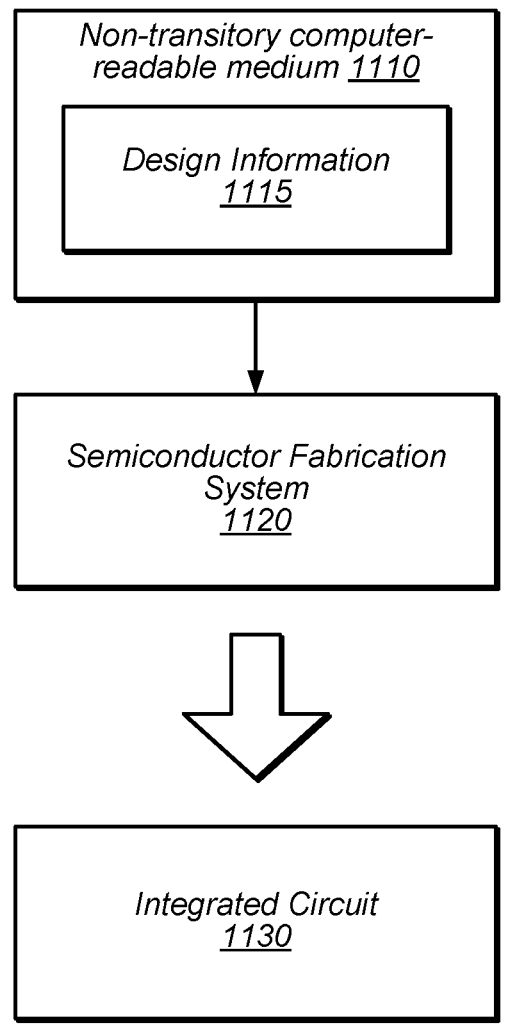
FIG. 11 is a block diagram of an example computer-readable medium, according to some embodiments.

FIG. 11 is a block diagram illustrating an example of a non-transitory computer-readable storage medium that stores circuit design information, according to some embodiments. The embodiment of FIG. 11 may be utilized in a process to design and manufacture integrated circuits, for example, systems including one or more instances of systems 100*a*, 100*b*, 200, or 500 shown in FIGS. 1-5. In the illustrated embodiment, semiconductor fabrication system 1120 is configured to process the design information 1115 stored on non-transitory computer-readable storage medium 1110 and fabricate integrated circuit 1130 based on the design information 1115.

Non-transitory computer-readable storage medium 1110, may comprise any of various appropriate types of memory devices or storage devices. Non-transitory computer-readable storage medium 1110 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1110 may include other types of non-transitory memory as well or combinations thereof. Non-transitory computer-readable storage medium 1110 may include two or more memory mediums which may reside in different locations, e.g., in different computer systems that are connected over a network.

Design information 1115 may be specified using any of various appropriate computer languages, including hardware description languages such as, without limitation: VHDL, Verilog, SystemC, SystemVerilog, RHDL, M, MyHDL, etc. Design information 1115 may be usable by semiconductor fabrication system 1120 to fabricate at least a portion of integrated circuit 1130. The format of design information 1115 may be recognized by at least one semiconductor fabrication system, such as semiconductor fabrication system 1120, for example. In some embodiments, design information 1115 may include a netlist that specifies elements of a cell library, as well as their connectivity. One or more cell libraries used during logic synthesis of circuits included in integrated circuit 1130 may also be included in design information 1115. Such cell libraries may include information indicative of device or transistor level netlists, mask design data, characterization data, and the like, of cells included in the cell library.

Integrated circuit 1130 may, in various embodiments, include one or more custom macrocells, such as memories, analog or mixed-signal circuits, and the like. In such cases, design information 1115 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 is configured to operate according to a circuit design specified by design information 1115, which may include performing any of the functionality described herein. For example, integrated circuit 1130 may include any of various elements shown or described herein. Further, integrated circuit 1130 may be configured to perform various functions described herein in conjunction with other components.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(*f*) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus comprising:
a processor circuit including:
a return address stack circuit;
a return prediction circuit configured to store, for previously accessed return addresses, corresponding fetch parameters for next fetch addresses; and
a fetch control circuit configured to:
in response to an initial fetch of a call instruction:
push a return address onto the return address stack circuit; and
use the return address to determine whether a corresponding entry currently exists in the return prediction circuit; and
in response to an initial fetch of a return instruction that corresponds to the call instruction:
in response to a determination that the corresponding entry does not currently exist in the return prediction circuit, generate the corresponding entry for the return address based on particular fetch parameters determined when the return instruction is performed; and
in response to a subsequent fetch of the call instruction, push the return address onto the return address stack circuit; and
in response to a subsequent fetch of the return instruction that corresponds to the call instruction:
retrieve the return address from the return address stack circuit; and
create, using the return address and particular fetch parameters retrieved from the generated entry in the return prediction circuit, a next fetch request to retrieve instructions subsequent to the return instruction.

2. The apparatus of claim 1, wherein the fetch control circuit is further configured to retrieve the particular fetch parameters from the return prediction circuit in response to the subsequent fetch of the return instruction.

3. The apparatus of claim 1, wherein the fetch control circuit is further configured, in response to the subsequent fetch of the call instruction, to retrieve the particular fetch parameters from the return prediction circuit and push the particular fetch parameters onto the return address stack circuit.

4. The apparatus of claim 3, wherein the fetch control circuit is further configured to retrieve the particular fetch parameters from the return address stack circuit in response to the subsequent fetch of the return instruction.

5. The apparatus of claim 1, wherein the fetch control circuit is further configured to select, for the generated entry, a particular entry space in the return prediction circuit using a linear-feedback shift register.

6. The apparatus of claim 1, wherein the particular fetch parameters include a fetch width that is indicative of a number of instructions to be retrieved in the next fetch request.

7. The apparatus of claim 1, further comprising a branch predictor circuit, including a plurality of banks, and configured to store information related to previously executed branch instructions in corresponding ones of the plurality of banks; and
wherein the particular fetch parameters include a bank value indicative of a particular bank of the plurality of banks to be accessed in the next fetch request.

8. The apparatus of claim 1, further comprising:
a sequential prediction circuit configured to store, for a sequential fetch address, sequential fetch parameters for use in a subsequent fetch request; and
wherein the fetch control circuit is further configured to:
   determine that a next fetch address is the sequential fetch address; and
   in response to a determination that the sequential prediction circuit includes an entry for the sequential fetch address, create, using the sequential fetch parameters retrieved from the sequential prediction circuit, a next fetch request to retrieve instructions starting at the sequential fetch address.

9. The apparatus of claim 8, wherein the fetch control circuit is further configured, in response to an initial fetch operation using the sequential fetch address, to:
   determine the sequential fetch parameters associated with a retrieval of instructions from the sequential fetch address; and
   in response to a determination that at least one of the determined sequential fetch parameters satisfies a particular condition, store the sequential fetch parameters in an entry in the sequential prediction circuit.

10. A method comprising:
storing, by a fetch control circuit, given fetch parameters in a return prediction circuit, wherein the given fetch parameters correspond to previously accessed return addresses;
in response to fetching a call instruction:
   retrieving particular fetch parameters from the return prediction circuit, wherein the particular fetch parameters correspond to a return address for the call instruction; and
   pushing, by the fetch control circuit, the return address and the particular fetch parameters onto a return address stack circuit; and
in response to fetching a return instruction corresponding to the call instruction:
   retrieving, by the fetch control circuit, the return address and the particular fetch parameters from the return address stack circuit; and
   creating, by the fetch control circuit using the return address and the particular fetch parameters, a next fetch request to retrieve instructions subsequent to the return instruction.

11. The method of claim 10, further comprising:
determining, by the fetch control circuit, that the particular fetch parameters include a bank value for a branch predictor circuit; and
sending, by the fetch control circuit to the branch prediction circuit, a branch prediction request that includes the return address and the bank value indicative of a particular memory bank of a plurality of memory banks to be accessed for the branch prediction request.

12. The method of claim 11, further comprising,
determining, by the branch predictor circuit, that the bank value results in a failure to identify an entry in the particular memory bank; and
providing, by the branch predictor circuit, an indication to the fetch control circuit to update the particular fetch parameters.

13. The method of claim 10, further comprising:
in response to a fetch of a given call instruction, determining, by the fetch control circuit, whether an entry for a corresponding return address currently exists in the return prediction circuit; and
in response to determining that a current entry does not exist in the return prediction circuit, generating, by the fetch control circuit, an entry for the corresponding return address based on fetch parameters determined when a first occurrence of the return instruction is performed after the determining the current entry does not exist.

14. The method of claim 13, further comprising, in response to determining that the return prediction circuit is full:
adjusting, by the fetch control circuit using a particular amount, a respective counter for a selected entry of the return prediction circuit; and
in response to determining that the respective counter has a particular value, replacing fetch parameters in the selected entry with the determined fetch parameters for the first occurrence of the return instruction.

15. The method of claim 10, further comprising:
determining, by the fetch control circuit, that a fetch address for a subsequent fetch request is a sequential fetch address; and
in response to determining that a sequential prediction circuit includes an entry for the sequential fetch address, creating, by the fetch control circuit using sequential fetch parameters retrieved from the sequential prediction circuit, a next fetch request to retrieve instructions starting at the sequential fetch address.

16. A system comprising:
a branch predictor circuit, including a plurality of memory banks, and configured to provide a predicted direction for a fetched conditional branch instruction using information stored in the plurality of memory banks;
an instruction fetch circuit configured to:
   store, in respective entries in a memory circuit, given fetch parameters corresponding to previously accessed return addresses;
   in response to a fetch of a call instruction, push a return address onto a return address stack;
   in response to a fetch of a return instruction corresponding to the call instruction:
      retrieve the return address from the return address stack; and
      send, to the branch prediction circuit, a branch prediction request that includes the return address and particular fetch parameters corresponding to the return address, wherein the particular fetch parameters include a bank value indicative of a particular memory bank of the plurality of memory banks to be accessed in a next fetch request.

17. The system of claim 16, wherein the return address stack is stored in the memory circuit.

18. The system of claim 16,
wherein the branch predictor circuit is further configured to:
   determine that the bank value results in a failure to identify an entry in the particular memory bank corresponding to the return address; and
   in response to the determination, provide an indication to the instruction fetch circuit to update the particular fetch parameters.

19. The system of claim 16, wherein a particular fetch parameter entry includes a value of a fetch width used to indicate a control transfer instruction in a corresponding fetch group; and wherein the instruction fetch circuit is further configured to:
determine that the value of the fetch width results in a failure to retrieve a subsequent control transfer instruction in the corresponding fetch group; and
in response to the determination, update the particular fetch parameter entry.

20. The system of claim 16, wherein the instruction fetch circuit is further configured to:
store sequential fetch parameters corresponding to a previously accessed sequential fetch address;
determine that a next fetch address is the sequential fetch address; and
in response to a determination that the sequential fetch parameters have been stored, create, using the sequential fetch parameters, a next fetch request to retrieve instructions starting at the sequential fetch address.

* * * * *